United States Patent Office 3,215,708
Patented Nov. 2, 1965

3,215,708
POLYHYDRONAPHTHALENE DIEPOXIDES
Hsing Yun Fan and William E. Rader, Modesto, Calif., Marvin Legator, Rockville, Md., and Linda C. Dowding, now, by change of name, Linda C. Larrick, Modesto, Calif., assignors to Shell Oil Company, New York, N.Y., a corporation of Delaware
No Drawing. Filed July 6, 1964, Ser. No. 380,611
6 Claims. (Cl. 260—348)

This application is a continuation-in-part of U.S. application Serial No. 87,991, filed February 9, 1961, now abandoned.

This invention pertains to novel polycyclic diepoxides, more particularly described as polyhydronaphthalene diones containing two epoxide rings, one of these epoxide rings involving the carbon atoms in the 4a and 8a positions, and the other involving the carbon atoms in the 2 and 3 positions. The novel compounds of this invention thus have the essential character represented by the structural formula:

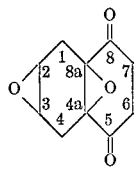

(I)

In terms of name, these compounds can be designated as 2,3,4a,8a-diepoxy - polyhydronaphthalene-5,8 - diones. Included in this general class of epoxides are those wherein a methano bridge joins the carbon atoms at the 1- and 4-positions. These, of course, are the 2,3:4a,8a-diepoxy-polyhydro-1,4-methanonaphthalene-5,8-diones.

Described more particularly, the compounds of this invention are characterized by the structural formula:

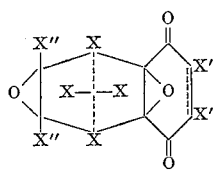

(II)

wherein each X, X', and X" is individually selected from the group consisting of hydrogen, middle halogen (i.e., bromine and chlorine) and low molecular weight organic groups, with the proviso that at least one of X" is hydrogen. The broken lines in the formula indicate the fact that this class of novel compounds includes those having a methano bridge between the carbon atoms in the number 1- and number 4-positions, as well as those having no such bridge, and those compounds having an ethylenic or double bond between the carbon atoms in the number 6 and 7 positions, as well as those which have a saturated or single bond between those same two carbon atoms.

The organic groups represented by the symbols X, X' and X", respectively, preferably are low molecular weight hydrocarbon or substituted hydrocarbon—i.e., groups containing not more than about 10 carbon atoms each—and the compounds of greatest interest are those wherein each of the organic groups represented by these symbols is a hydrocarbon group. Such hydrocarbon groups may be of either aliphatic or cyclic configuration; they may be saturated, olefinically unsaturated or aromatically unsaturated; preferably they are free from acetylenic unsaturation. The aliphatic groups may be of straight-chain or of branched-chain configuration. The aromatic groups preferably are mononuclear. Thus, suitable organic groups include both straight-chain and branched-chain alkyl such as methyl, ethyl, n- and iso-propyl, n-, sec-, and tert-butyl, the various isomeric $C_5$, $C_6$ and like alkyl groups, cycloalkyl such as the cyclopentyl, cyclohexyl, methylcyclohexyl, dimethylcyclooctyl, 3,5,5-trimethylcyclohexyl, and like cycloalkyl groups, aryl such as the phenyl group, alkaryl such as the methylphenyl, ethylphenyl and like alkaryl groups, aralkyl such as the benzyl, phenethyl and like aralkyl groups, alkenyl such as the allyl, crotyl and like groups, alkadienyl such as the butadienyl, pentadienyl and like alkadienyl groups, and mixed groups such as the vinylphenyl, allylphenyl, phenylvinyl, phenylcrotyl, phenylallyl groups, and the like. Of the substituted hydrocarbon groups, those hydrocarbon groups set out above which are substituted by one or more of halogen, cyano and nitro are preferred. Because of their properties, the compounds wherein the organic groups represented by the symbols X, X', and X" are alkyl of from 1 to 6 carbon atoms are preferred.

Of these compounds, the subclass wherein there is a 1,4-methano bridge, an olefinic double bond between the carbon atoms in the 6- and 7-positions, and at least one of X' is middle halogen are of particular interest because of their high toxicity toward microorganisms. In terms of name, these preferred compounds can be designated as 2,3:4a,8a-diepoxy-polyhydro-1,4-methanonaphthalene-5,8-diones 6,7-olefinically unsaturated and containing halogen on at least one of the carbon atoms at the 6 and 7 positions. From the available data, it appears that the 6,7-di(middle halo) compounds of this subclass have the highest toxicity toward a broad spectrum of microorganisms.

Since starting materials for the preparation of such compounds wherein all of X and X" are hydrogen are at present most readily available and the resulting compounds exhibit high activity toward microorganisms, the compounds of this class wherein all of X and X" are hydrogen are preferable. These compounds would, of course, be the 1,2,3,4,4a,8a-hexahydro members of the class.

The compounds of this invention can exist in the form of stereoisomers, of two general types: one in which the two epoxy rings are in cis configuration, and one in which the two epoxy rings are in trans configuration. That is, if the carbon atoms of the hexane ring are considered to lie in the same plane, both of the epoxy rings lie on the same side of that plane, or the two epoxy rings can lie on opposite sides of that plane, respectively. (As used herein, the term "stereoisomer" designates only the geometric isomers whose spatial configuration differs, and does not include optical isomers—isomer pairs which exist because one is the mirror image of the other.)

In the compounds of this invention in which no methano bridge is present, there are thus two series of stereoisomers. However, in the compounds of this invention in which a methano bridge is present, there are four series of stereoisomers. This results because, as is shown in U.S. Patent No. 2,717,851, in a bicycloheptane structure, the methano bridge does not lie in the same plane as the carbon atoms of the hexane ring. Thus, in the compounds of this invention wherein a methano bridge is present, each of the epoxy rings can be of cis or trans configuration with respect to the methano bridge, and also can be of cis or trans configuration with respect to the other epoxy ring. In terms of more conventional nomenclature employed with bridged rings, the compounds of the invention can be exo-2,3:exo-4a,8a-diepoxy, or exo-2,3:endo-4a,8a-diepoxy, or endo-2,3:exo-4a,8a-diepoxy, or endo-2,3:endo-4a,8a-diepoxy in configuration.

Typical species of the compounds of this invention include:

6,7-dichloro-exo-2,3:endo-4a,8a-diepoxy-1,2,3,4,4a,8a-hexahydro-exo-1,4-methanonaphthalene-5,8-dione;
6,7-dichloro-exo-2,3:exo-4a,8a-diepoxy-1,2,3,4,4a,8a-hexahydro-endo-1,4-methanonaphthalene-5,8-dione;
6,7-dichloro-endo-2,3:exo-4a,8a-diepoxy-1,2,3,4,4a,8a-hexahydro-endo-1,4-methanonaphthalene-5,8-dione;
6,7-dichloro-endo-2,3:endo-4a,8a-diepoxy-1,2,3,4,4a,8a-hexahydro-exo-1,4-methanonaphthalene-5,8-dione;
Cis-(2,3:4a,8a-diepoxy)decalin-5,8-dione;
Trans-(2,3:4a,8a-diepoxy)decalin-5,8-dione;
6,7-dichloro-cis-(2,3:4a,8a-diepoxy)-1,2,3,4,4a,6,7,8a-octahydronaphthalene-5,8-dione;
6,7-dibromo-trans-(2,3:4a,8a-diepoxy)-1,2,3,4,4a,6,7,8a-octahydronaphthalene-5,8-dione;
7-methyl-cis-(2,3:4a,8a-diepoxy)decalin-5,8-dione;
2-methyl-trans-(2,3:4a,8a-diepoxy)decalin-5,8-dione;
Exo-2,3:exo-4a,8a-diepoxy-1,2,3,4,4a,8a-hexahydro-endo-1,4-methanonaphthalene-5,8-dione;
Exo-2,3:endo-4a,8a-diepoxy-1,2,3,4,4a,6,7,8a-octahydro-exo-1,4-methanonaphthalene-5,8-dione;
7-methyl-exo-2,3:endo-4a,8a-diepoxy-1,2,3,4,4a,8a-hexahydro-exo-1,4-methanonaphthalene-5,8-dione;
2-methyl-exo-2,3:exo-4a,8a-diepoxy-1,2,3,4,4a,8a-hexahydro-endo-1,4-methanonaphthalene-5,8-dione;
2,6,7-trichloro-endo-2,3:exo-4a,8a-diepoxy-1,2,3,4,4a,8a-hexahydro-endo-1,4-methanonaphthalene-5,8-dione;
1,2,4,6,7,9,9-heptachloro-endo-2,3:endo-4a,8a-diepoxy-1,2,3,4,4a,8a-hexahydro-exo-1,4-methanonaphthalene-5,8-dione;
1,4,7,9,9-pentabromo-exo-2,3:exo-4a,8a-diepoxy-1,2,3,4,4a,8a-hexahydro-endo-1,4-methanonaphthalene-5,8-dione;
2,6-dimethyl-exo-2,3:endo-4a,8a-diepoxy-1,2,3,4,4a,8a-hexahydro-exo-1,4-methanonaphthalene-5,8-dione;
1,4,9,9-tetrachloro-endo-2,3:exo-4a,8a-diepoxy-1,2,3,4,4a,8a-hexahydro-endo-1,4-methanonaphthalene-5,8-dione;
2,7-dibromo-exo-2,3:exo-4a,8a-diepoxy-1,2,3,4,4a,8a-hexahydro-endo-1,4-methanonaphthalene-5,8-dione;
2,6-dichloro-exo-2,3:endo-4a,8a-diepoxy-1,2,3,4,4a,8a-hexahydro-endo-1,4-methanonaphthalene-5,8-dione;
1,4,6,7-tetrabromo-endo-2,3:endo-4a,8a-diepoxy-1,2,3,4,4a,8a-hexahydro-exo-1,4-methanonaphthalene-5,8-dione;
1,2,4,6,9,9-hexachloro-endo-2,3:exo-4a,8a-diepoxy-1,2,3,4,4a,8a-hexahydro-endo-1,4-methanonaphthalene-5,8-dione;
7-methyl-exo-2,3:endo-4a,8a-diepoxy-1,2,3,4,4a,6,7,8a-octahydro-exo-1,4-methanonaphthalene-5,8-dione;
6-phenyl-exo-2,3:endo-4a,8a-diepoxy-1,2,3,4,4a,6,7,8a-octahydro-exo-1,4-methanonaphthalene-5,8-dione;
2-benzyl-endo-2,3:endo-4a,8a-diepoxy-1,2,3,4,4a,6,7,8a-octahydro-exo-1,4-methanonaphthalene-5,8-dione;
6-chloro-exo-2,3:endo-4a,8a-diepoxy-1,2,3,4,4a,8a-hexahydro-exo-1,4-methanonaphthalene-5,8-dione;
6-bromo-endo-2,3:exo-4a,8a-diepoxy-1,2,3,4,4a,8a-hexahydro-endo-1,4-methanonaphthalene-5,8-dione;
6-methylexo-2,3:endo-4a,8a-diepoxy-1,2,3,4,4a,8a-hexahydro-exo-1,4-methanonaphthalene-5,8-dione;
6-chloro-exo-2,3:endo-4a,8a-diepoxy-1,2,3,4,4a,6,7,8a-octahydro-exo-1,4-methanonaphthalene-5,8-dione;
6-chloro-7-methyl-exo-2,3:endo-4a,8a-diepoxy-1,2,3,4,4a,8a-hexahydro-exo-1,4-methanonaphthalene-5,8-dione.

Preferred methods for preparing the compounds of this invention involve epoxidation of the corresponding di-ethylenically unsaturated compounds—that is, the corresponding polyhydronaphthalene-5,8-diones and the corresponding 1,4-dihydro-1,4-methanonaphthalene-5,8-diones. Copending application Serial No. 162,965 filed December 28, 1961, discloses novel 4a,8a-epoxy-4a,8a-dihydronaphthalene-5,8-diones, and methods for their preparation. These 4a,8a-epoxides can be directly epoxidized to the corresponding 2,3:4a,8a-diepoxy compounds of this invention. For details of the preparation of the 4a,8a-epoxy precursors, reference is hereby made to said copending application Serial No. 162,965. Briefly, however, these 4a,8a-epoxy precursors can be prepared as follows:

*Step I.*—A suitable butadiene or cyclopentadiene compound is reacted in a Diels-Alder type of synthesis with a suitable halogenated quinone.

*Step II.*—The product of Step I is reacted with acetic acid and zinc, and then with chromic acid.

These two steps are described in detail in the Journal of the American Chemical Society, vol. 76, page 6150 (1954).

*Step III.*—The product of Step II is epoxidized by reaction with hydrogen peroxide in the presence of sodium carbonate or other water-soluble, alkaline material at about room temperature.

Conduct of this epoxidation is set out in detail in Serial No. 162,965. As is shown therein, in those compounds containing a methano bridge, the product can be in either of two stereoisomeric forms—one in which the methano bridge and epoxy ring are cis, and one in which the methano bridge and epoxy ring are trans, with respect to the bridged ring.

This method results in the compounds of this invention wherein the carbon atoms in the 6 and 7 positions are joined by an olefinic double bond. Compounds of this invention wherein the carbon atoms in the 6 and 7 positions are saturated can be prepared by hydrogenation of the olefinic double bond. Orthodox methods for effecting hydrogenation of olefinic double bonds can be used to effect the hydrogenation in this case also.

*Step IV.*—The diepoxides of this invention are prepared from the monoepoxides by means of acid epoxidation, employing a peracid as the epoxidizing agent. The conduct of the epoxidation is wholly in accord with the well known principles for conducting the peracid epoxidation of an isolated olefinic double bond, these principles being discussed in the article by Swern, Chemical Reviews, vol. 45, pages 1–68 (1949). The most convenient peracids are performic acid, peracetic acid, perbenzoic acid and monoperphthalic acid.

In general, about one mole of the peracid is used per mole of the monoepoxide, although in some cases it may be desirable to employ a small excess—say, up to about 10–20 percent excess—of the peracid. Preferably the epoxidation is carried out in a suitable mutual solvent for the reactants and product. Chloroform is an especially useful solvent for the purpose, but other materials such as diethyl ether, dichloromethane, benzene, ethyl acetate, etc., and the like, may be used. The temperature employed for effecting the epoxidation may vary over a considerable range, depending upon the particular reactants used. Generally, suitable temperatures will be found to be within the range of from about —20° C. to about 80° C. Often ordinary room temperature, that is, from about 10° C. to about 30° C.—will be found suitable. In some cases, it will be found desirable to mix the reactants at a lower temperature, then heat the mixture somewhat to effect completion of the reaction. The diepoxide product obtained by this method can be recovered from the crude reaction mixture by any convenient means known to the art, such as distillation, extraction, fractional precipitation or the like.

The evidence indicates that the major products of this process are the diepoxides of this invention having the two epoxide rings on opposite sides of the common cyclohexane ring—that is, the compounds of this invention containing no methano bridge having the trans-diepoxy configuration, and the compounds of this invention containing the methano bridge having the exo-2,3:endo-4a,8a-diepoxy-exo-1,4-methano configuration.

Steps III and IV can be inverted. In this case, the major products are the diepoxides wherein the two epoxide rings lie on the same sides of the common cyclohexane ring—the products being those with the cis-diepoxy configuration, including those with the endo-2,3:endo-4a,8a-diepoxy-exo-1,4-methano configuration.

To further illustrate these methods for preparing the compounds of this invention, and the appropriate materials and conditions to be used, the following examples show the preparation of a typical member of the most preferred compounds of this invention—that is, those compounds wherein there is an olefinic double bond between the carbon atoms in the 6 and 7 positions, and each of those carbon atoms is bonded to a middle halogen atom.

*Example I*

A solution of 65 grams of a mixture of isomers of 6,7 - dichloro - 4a,8a - epoxy - 1,4,4a,8a - tetrahydro - 1,4-methanonaphthalene-5,8-dione, prepared according to the method set forth in copending application Serial No. 162,965, in 390 milliliters of chloroform was stirred into a solution of 3 grams of sodium acetate in 65 milliliters of 40% peroxyacetic acid and the mixture was allowed to stand for 23 hours at room temperature. The mixture then was diluted with water and the separated water layer was extracted with chloroform. The chloroform solution was dried over anhydrous sodium sulfate and evaporated almost to dryness by means of air blowing. The resulting residue was triturated with methanol to give 55 grams of product which was mainly 6,7-dichloro-exo-2,3:endo - 4a,8a - diepoxy - 1,2,3,4,4a,8a-hexahydro-exo-1,4-methanonaphthalene-5,8-dione. Pure material was obtained by recrystallization from chloroform, chromatography over alumina in methylene chloride, and successive recrystallization from ethyl acetate and benzene; M.P. 195–196° C.

Analysis for $C_{11}H_6O_4Cl_2$:

|  | C | H | Cl |
| --- | --- | --- | --- |
| Calculated_____percent__ | 48.3 | 2.2 | 26.0 |
| Found_____do____ | 48.5 | 2.6 | 26.0 |

A second crop (9.5 grams) from the first recrystallization was triturated with chloroform to leave 0.8 gram of a solid which was identified as 6,7-dichloro-endo-2,3:endo-4a,8a-diepoxy-1,2,3,4,4a,8a - hexahydro-exo-1,4-methanonaphthalene-5,8-dione by comparison of its infrared spectrum with that of the product of Example II.

In another experiment the single isomer, 6,7-dichloro-endo-4a,8a-epoxy-1,4,4a,8a-tetrahydro-exo - 1,4-methanonaphthalene-5,8-dione, M.P. 118–110° C., gave upon epoxidation with peroxyacetic acid a mixture which infrared analysis indicated to contain about 80% of the above diepoxide and 20% of the diepoxide of Example II. NMR data showed that the monoepoxide of M.P. 118°–119° C., the major component of the mixture of isomers used in the first experiment, has its epoxide group oriented endo. On the basis of the known course of exo-epoxide formation in bicycloheptene systems, it is our belief that the 2,3-epoxy group of the diepoxide of M.P. 195–196° C. is oriented exo. Since the diepoxide of Example II also formed from the monoepoxide of M.P. 118–119° C., its difference apparently lies in the orientation of the 2,3-epoxy group which is then endo. It will be recognized that just as the monoepoxide of M.P. 118–119° C. is capable of yielding two diepoxides, in a similar way its stereoisomeric monoepoxide is capable of yielding two other diepoxides. These four stereoisomeric diepoxides are indicated to be present in the crude product of the first experiment described above.

*Example II*

21.3 milliliters of trifluoroacetic anhydride was added portionwise to an ice-chilled suspension of 35 milliliters of 90% hydrogen peroxide in 25 milliliters of methylene dichloride over a 10-minute period, with stirring. The mixture then was stirred at the temperature of melting ice for another 15 minutes, and then was added dropwise with stirring to a mixture of 24.1 grams of 6,7-dichloro-1,4-dihydro-1,4-methanonaphthalene-5,8-dione and 42.5 grams of dry sodium carbonate in 100 milliliters of methylene dichloride, over a period of 40 minutes. After the addition was complete, the resulting mixture was heated to reflux and refluxed for 35 minutes. The inorganic salt was removed by decantation. The liquid was evaporated to near dryness and the residue was then triturated with methanol to give 13.9 grams of yellow solid, melting point 157–161° C. This material was recrystallized twice from ethyl acetate and once from benzene to give 4.3 grams of 6,7-dichloro-endo-2,3-epoxy-1,2,3,4-tetrahydro-1,4-methanonaphthalene-5,8-dione, melting at 182–183° C.

Analysis for $C_{11}H_6O_3Cl_2$:

|  | C | H | Cl |
| --- | --- | --- | --- |
| Calculated_____percent__ | 51.3 | 2.3 | 27.6 |
| Found_____do____ | 51.6 | 2.7 | 27.7 |

A solution of 2.14 grams of sodium carbonate in 8 milliliters of water and 25.7 milliliters of 30% hydrogen peroxide solution in water was added in portions over a 5-minute period with vigorous stirring at room temperature to a suspension of 25.7 grams of the epoxide in 257 milliliters of 1,2-dimethoxyethane. The reaction temperature rose to 50° C. and then slowly returned to room temperature. After 4 hours, the reaction mixture was diluted with water to precipitate 16.7 grams of product which was mainly 6,7-dichloro-endo-2,3:endo-4a,8a-diepoxy - 1,2,3,4,4a,8a - hexahydro - exo - 1,4 - methanonaphthalene-5,8-dione. Successive recrystallizations from ethyl acetate and benzene afforded pure material melting at 176–177° C.

Analysis for $C_{11}H_6O_4Cl_2$:

|  | C | H | Cl |
| --- | --- | --- | --- |
| Calculated_____percent__ | 48.3 | 2.2 | 26.0 |
| Found_____do____ | 47.9 | 2.6 | 26.2 |

The designation of the isomeric structure of this diepoxide is discussed in Example I. Since the 2,3-epoxy group of this product is believed to be endo, then the corresponding precursor monoepoxide of M.P. 182-183° C. described above may be designated as having an endo-2,3-epoxy configuration.

The diepoxides of the present invention are highly toxic with respect to microorganisms, including fungi, bacteria, and molds. Since these diepoxides are substantially non-toxic to plants, including their seeds, when used at the dosages effective against microorganisms present on those plants, these diepoxides can be used as foliage fungicides and as seed-treating agents. Further, since these diepoxides are substantially non-toxic with respect to mammals at dosages effective against fungi, bacteria and molds, these diepoxides can be used to preserve foods to be consumed by mammals, including humans.

To demonstrate the effectiveness of these diepoxides as foliage fungicides, a typical species of these diepoxides—6,7 - dichloro - exo - 2,3:endo-4a,8a-diepoxy-1,2,3,4a,8a-hexahydro-exo-1,4-methanonaphthalene-5,8 - dione, M.P. 195-196°C—was tested against eleven foliage pathogens on various plant hosts. The pathogens and hosts used were as follows:

| Pathogen | Host |
| --- | --- |
| Phytophthora infestans (late blight) | Potato (Solanum tuberosum). |
| Phytophthora phaseoli (downy mildew) | Lima bean (Phaseolus lunatus (var. Fordhook 242)). |
| Uromyces phaseoli (rust) | Bean (Phaseolus vulgaris (var. Pinto)). |
| Colletotrichum lindemuthianum (anthracnose). | Bean (Phaseolus vulgaris (var. Black Valentine)). |
| Puccinia recondita (rust) | Wheat (Triticum aesitivum). |
| Venturia inaequalis (scab) | Apple (Pyrus malus). |
| Alternaria solani (early blight) | Tomato (Lycopersicum esculentum) |
| Stemphylium solani (gray leaf spot) | Tomato. |
| Helminthosporium turcicum (blight) | Corn (Zea mays). |
| Colletotrichum lagenarium (anthracnose). | Cucumber (Cucumbus sativus). |
| Erysiphe cichoracearum (powdery mildew). | Cucumber. |

The test was carried out according to the following procedure. The test chemicals were prepared at 1% w./v. stock solutions in a solvent. The stock was diluted for spraying, using a diluent consisting of distilled water plus solvent (1:1) or diluent consisting of distilled water plus two co-solvents (2:1:1). Triton X-155, at 0.005-0.10% w., was used as a wetting agent for each conncentration of toxicant. All chemicals were initially tested at a single concentration of 1000 p.p.m. Disease control being shown the chemicals were retested at 1000 p.p.m., and the next lowest dilution of 500 p.p.m. The chemicals were then retested in this fashion at successively lower concentrations until the minimum effective concentration was determined.

With the mist-type spray and the diluent mixture which was applied, a drying interval of one to two hours was sufficient before inoculation with spore suspensions using an atomizer. Inoculations with bean mildew were made by dusting conidia over treated plants in the greenhouse. After 24 hours incubation at 19° C. and 100% humidity, the plants were removed to the controlled environment greenhouse for symptom development. Disease control and phytotoxicity assessments were made within seven days. Of the greatest significance is the fact that compounds of the present invention are outstanding fungicides yet do not manifest signficant phytotoxicity.

The following table summarizes the results of screening:

TABLE I

| Pathogen | Minimum Effective Concentration of Test Compound (parts per million by weight) | |
| --- | --- | --- |
| | A[1] | B[2] |
| Phytophthora infestans (late blight) | 63-125 | 250 |
| Phytophthora phaseoli (downy mildew) | 500 | |
| Uromyces phaseoli (rust) | 63-125 | 63-125 |
| Colletotrichum lindemuthianum (anthracnose) | 125-250 | 63 |
| Puccinia recondita (rust) | 32-63 | 1,000 |
| Venturia inaequalis (scab) | 63 | 1,000 |
| Alternaria solani (early blight) | 500-1,000 | 250 |
| Stemphylium solani (gray leaf spot) | 250 | |
| Helminthosporium turcicum (blight) | 500 | |
| Colletotrichum lagenarium (anthracnose) | 250 | 1,000 |
| Erysiphe cichoracearum (powdery mildew) | 500 | |

[1] Test compound A—6,7-dichloro-exo-2,3:endo-4a,8a-diepoxy-1,2,3,4,4a, 8a-hexahydro-exo-1,4-methanonaphthalene-5,8-dione, melting at 195-196° C.
[2] Test compound B—6,7-dichloro-endo-2,3:endo-4a,8a-diepoxy-1,2,3,4, 4a,8a-hexahydro-exo-1,4-methanonaphthalene-5,8-dione, melting at 176-177° C.

In no case was there observed phytotoxicity of the test compound toward the host plants.

Further tests were made to determine the persistence of test compound A. Application was made with a sprayer to field grown potato plants. At 24-hour intervals shoots were cut from these plants, placed in a 5 percent sucrose solution and inoculated with spores of Phytophthora infestans. The following table gives the time in days for the test compound to lose activity. Varying concentrations of the test compound were used, as shown in the table.

TABLE II

| Concentration of test compound, lb./100 gallons: | Time in days for test compound to lose activity |
| --- | --- |
| ½ | 5 |
| ¼ | 5 |
| ⅛ | 4 |
| 1/16 | 4 |

It is accordingly evident that the test compound is quite persistent, providing protection for from 4 to 5 days after its application.

The effectiveness of compounds of this invention against typical soil-inhabiting fungi which attack both dormant and germinating seeds was shown by the results of the following tests: Test compound A was applied to sugar beet seeds at two dosages and the seeds planted in a soil containing "damping-off" fungi consisting of Phythium and Rhizoctonia species. 10-14 days after planting, the seeds were examined to determine the percent germinated and percent destroyed by the fungi—i.e., "damped-off." Checks were also made of untreated soil and of soil sterilized by steaming. The results:

TABLE III

| Test Compound | Percent germination at dosage of— | |
| --- | --- | --- |
| | 8 oz./100 lb. seed | 4 oz./100 lb. seed |
| Compound A | 90 | 80 |
| None—steamed soil | 100 | 100 |
| None—untreated soil | 9 | 9 |

Similar results were obtained on the treatment of cotton seed.

The compounds of the present invention are active against a broad spectrum of microorganisms and bacteria in addition to the foliage and soil-inhabiting fungi already discussed. As a consequence of this unique activity, the compounds of the present invention may be put to medicinal uses. The following in vitro test results are illustrative of the usefulness of compounds of this invention when used for such purposes.

TABLE IV

| Organism | End point in micrograms per ml. of medium (p.p.m.) for complete inhibition | |
| --- | --- | --- |
| | A[1] | B[2] |
| Gram—negative Bacteria: | | |
| Pseudomonas aeruginosa | 10-15 | >150 |
| Proteus vulgaris | 5-10 | 80-100 |
| Escherichia coli | 10-15 | >150 |
| Gram—positive Bacteria: | | |
| Leuconostic mesenteroides | 5-10 | 30-40 |
| Bacillus subtilis | <5 | 50-60 |
| Acid Fast Bacterium: | | |
| Mycobacterium avium | <10 | |
| Fungi: | | |
| Chaetomium globosum | <5 | 80-100 |
| Fusarium oxysporium | 5-10 | 80-100 |
| Sclerotium rolfsii | 5-10 | 80-100 |
| Penicillium italicum | 10-15 | |

[1] Test compound A—6,7-dichloro-exo-2,3:endo-4a,8a-diepoxy-1,2,3,4,-4a,8a-hexahydro-exo-1,4-methanonaphthalene-5,8-dione, melting at 195-196° C.
[2] Test compound B—6,7-dichloro-endo-2,3:endo-4a,8a-diepxoy-1,2,3,4,-4a,8a-hexahydro-exo-1,4-methanonaphthalene-5,8-dione, melting at 176-177° C.

It is evident that the test compound was effective against all of these bacteria and fungi. Of particular interest is the inhibitory action of this compound against P. aeruginosa, one of the hardest bacteria to attack chemically.

The active compounds of the present invention may be used alone or in combination with other fungicidal, viricidal, insecticidal or acaricidal materials, the action on which may be either internal or external, with plant nutritives, plant hormones, and the like. Wetting agents and, if necessary or desirable, stickers such as the heavy hydrocarbon oils with a minimum viscosity of 10° Engler at 50° C. can be present. The wetting agent must be non-reactive with the compounds of the present invention. Non-ionic surfactants seem preferable. If the toxic agents are employed in the form of emulsions or suspensions, for example, in water, solvents such as oils, emulsifiers, emulsion stabilizers, and the like may be added. Materials which suppress phytotoxic action may also be added if desired. For example, glucose is known to protect tomato plants against damage by certain substances having a phytotoxic effect when employed in concentrated form.

The compounds of the present invention may be applied by means of spraying. Spraying of the plants to be treated may be performed with aqueous emulsions, solutions, or suspensions of the active agents. The spray liquid is generally applied at a rate of from about 75 to 150 gallons per acre. If spraying is effected with smaller quantities of liquid as in low-volume spraying, high concentrations of the active agents should be employed. If desired, a minor amount of the order of about 0.001 to about 0.5% by weight of a wetting agent may be added to aid in forming a suspension in the aqueous medium. Any of the conventional wetting agents can be employed. Particularly suitable wetting agents are the sodium salts of a mixture of secondary heptadecyl sulfate, sold commercially under the name of "Teepol" and polyethylene glycol ethers of alkyl phenols sold under the trade names of "Triton X–100" and "Triton X–155." Preferably concentrated compositions comprising an active compound of the present invention and a suitable wetting agent are prepared, and the concentrate is then dispersed in water prior to use.

A further form in which the fungicidal compounds of the present invention may be applied consists of solutions of the active ingredient in suitable inert liquid or semi-solid diluents in which the active ingredient is present in molecularly dispersed form. The form in which the agents to be employed are applied to the objects treated depends on the nature of the object and the purpose of the application.

Suitable inert solvents for the manufacture of liquid preparations should not be readily flammable, as odorless as possible and without any toxic effect on humans and animals when properly used. Neither should they have a corrosive effect on the components of the preparations or the material of the storage vessel. Examples of suitable solvents are high-boiling oils, e.g., oils of vegetable origin, such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naphtha, etc. Mixtures of solvents may also be used. Non-aromatic petroleum oils and xylene are commonly employed.

The active compounds of the present invention may also be applied in the form of dusts, utilizing as the inert vehicle such materials as tricalcium phosphate, precipitated chalk, bentonite, kaolin, kieselguhr, etc.

These compounds may also be employed in the form of aerosols. For this purpose the active ingredient is dissolved or dispersed in a solvent boiling below room temperature at atmospheric pressure.

It has further been found that the compounds of the invention are useful for the preservation of foods, such as meats and dairy products, since they effectively destroy bacteria and molds which cause spoilage of such foods.

Thus 6,7 - dichloro - exo-2,3:endo-4a,8a-diepoxy-1,2,3,4,4a,8a-hexahydro-exo-1,4 - methanonaphthalene - 5,8-dione, a typical member of these compounds, was tested for its effectiveness in destroying mold organisms on cheese, under extremely severe conditions. In these tests, slices of cheddar cheese were inoculated with a spore suspension of Penicillium obtained from molded cheddar cheese. The slices were then incubated at 15° C. for 24 hours to initiate mold growth. Following incubation, a dilute solution of the test chemical was spread uniformly upon the surface of the cheese, using a soft brush. The treated slices then were placed in square petri dishes and incubated for 96 hours at 15° C. Slices of the inoculated cheese not treated with any chemical were handled in the same way, as checks. The effectiveness of the test in destroying mold is indicated by the percent of the surface of the cheese slice remaining free of mold. All of the untreated checks were completely overgrown with mold at the completion of the incubation. It was found that at a concentration of 50 and 100 parts per million by weight, the test compound was 95% effective in preventing mold. For comparison: at 100 parts per million, the effective concentration of the test compound was less than one-tenth that of the recommended standard, sorbic acid.

In further tests, the same compound was examined as follows: slices of cheddar cheese were inoculated with a spore suspension of Penicillium obtained from molded cheddar cheese and the suspension allowed to dry at room temperature. The cheese slices were then dipped in varying concentrations of the chemical for 3 minutes. The treated slices then were placed in square petri dishes alongside a similar inoculated but untreated slice. All of the slices then were incubated for 144 hours at 15° C. Three replicates were used at each test compound concentration. For comparsion, sorbic acid, the recommended standard for preserving cheese, was also tested. In these tests 6,7-dichloro-exo-2,3:endo-4a,8a-diepoxy-1,2,4,4a,8a-hexahydro-exo - 1,4 - methanonaphthalene-5,8-dione, M.P. 195–196° C., effected 90% reduction in mold over the check at a concentration of 50 parts per million; 98% reduction in mold at 100 parts per million, and effected complete (100%) reduction in mold at 200 parts per million. In contrast, sorbic acid effected 10% mold reduction at 500 parts per million concentration and 70% mold reduction at 1000 parts per million. In this evaluation, the compound of the invention was approximately 40 times more effective than the standard.

The effectiveness of the compounds of this invention in preserving cottage cheese was demonstrated by mixing fresh small curd cottage cheese purchased in cartons in a store with 6,7-dichloro-exo-2,3:endo-4a,8a-diepoxy-1,2,3,4,4a,8a-hexahydro-exo - 1,4 - methanonaphthalene-5,8-dione, and incubating the cheese at 15° C. At 24-hour intervals, the cheese was examined for organoleptic changes-primarily for sour odor. In addition, the cheese was subjected to the resazurin dye test. This is a dye reduction test which is a measure of the bacteria in dairy products. It is carried out by adding to dye to the cheese, then incubating the samples in the dark at 37° C. for one hour. The dye changes from the original blue to violet, red, pink, and finally white, depending upon the number of bacteria present. A blue color after one hour incubation usually indicates under 10,000 bacteria per gram, while the white color usually indicates 100,000,-000 or more bacteria per gram. Untreated cottage cheese was also subjected to these tests as a check.

It was found that the untreated cheese showed slight souring in 48 hours and was quite sour at the end of 72 hours. The resazurin test gave a white color after 72 hours.

The treated cheese became sour only after 120 hours at ten parts per million by weight of the test compound, after 144 hours at 25 parts per million of the test compound, and was not sour at the end of 144 hours at 50 parts per million of the test compound. At 10 parts per million of test compound, the resazurin test gave a red color at the end of 120 hours; at 25 parts per million of the test compound, the test gave a red color after 144 hours; at 50 parts per million of the test compound, the test gave a violet color at the end of 144 hours.

The test compound thus extended the storage time of cottage cheese from 2 to 4 days, at from 10 to 25 parts per million, respectively, and extended the storage time to more than 6 days at a concentration of 50 parts per million.

These diepoxides are highly active against a broad spectrum of microorganisms, including bacteria, yeasts, fungi and actinomyectes, and retain the activity in the presence of organic materials such as foods. Accordingly, they provide protection of food products against attack by bacteria, yeasts, fungal molds and slime molds. As indicated by the experimental data, only very small amounts of the compounds of the invention are required to preserve foods—concentrations of from about 5 to about 500 parts per million by weight of the food being generally suitable, with concentrations of from about 20 to about 100 parts per million being generally optimum. In the majority of cases, a concentration of the epoxide in excess of about one percent will not be required. Ordinarily, a concentration of at least 50 parts per million is employed to insure adequate protection, but it will not often be found necessary to employ more than about one-half percent of the epoxide to attain the protection desired. These diepoxides readily disperse in water, so that a dispersion of the diepoxides also can be used. If desired, suitable edible emulsifying agents can be added. These diepoxides also are soluble and/or readily dispersible in other materials, such as vegetable oils, fats and the like, and can be applied in the form of solutions or dispersions in these media. The diepoxides also can be incorporated in gelatin, algae, pectins or the like. If desired, the diepoxides can be dispersed in water, the dispersion frozen, and the frozen dispersion used in packing the food product. Solid compositions containing the diepoxides can be obtained by intimately mixing them with finely divided edible solids, such as milk solids, flours and the like.

Any suitable and convenient technique can be used to attain and insure the necessary intimate association of the diepoxides and the food products to be protected. Thus, the diepoxides can be incorporated into the food products, as by mixing the diepoxides with the food products. For example, hamburger, sausage and other ground meat products can be readily protected in this way. Where the food product is formed, and is essentially sterile, attack by microorganisms can be inhibited by coating the surface of the food product. To effect this coating, the food product can be dipped in a liquid or semi-liquid composition of the diepoxide, or washed or sprayed or painted with such a liquid or semi-liquid composition, or it can be dusted with a solid composition containing the diepoxides. The diepoxides can be incorporated in or on materials used for wrapping the food products—paper, parchment, cloth or other porous materials used for wrapping or gelatinous materials used for coating the food products can be impregnated with the diepoxides, and foil or plastic films and other non-porous wrapping materials can be coated with diepoxides.

Diepoxides of the invention are effective slimicides, as is shown by the fact that at a concentartion of 25 parts per million by weight 6,7-dichloro-exo-2,3:endo-4a,8a-diepoxy - 1,2,3,4,4a,8a - hexahydro-exo-1,4-methanonaphthalene-5,8-dione destroyed slime-forming organisms in an industrial white water obtained from an operating paper mill. The tests were performed by placing a sample of the white water and sufficient of the test compound to give the desired concentration, incubating the mixture at 37° C. for 48 hours, then streaking Emerson's agar with some of the incubated mixture, incubating the streaked medium for 48 hours at 37° C., then observing the medium to determine the presence or absence of slime growth.

The diepoxides are employed as slimicides in the manner and by the techniques known to practitioners of the art. In general, it is necessary only to add one or more of the diepoxides to provide the slimicidally effective dosage in the water to be treated. In some cases, this dosage will be as little as 5 parts per million parts by weight of the water, while in other cases a dosage of as much as 100 parts, or up to 250 parts, of the diepoxide, on the same basis, may be required.

These diepoxides also have been found to be effective mollusicicides, low concentrations in water killing aquatic mollusks such as snails living therein. Thus, it has been found that at a concentration of 3 parts per million by weight of the water, 6,7-dichloro-exo-2,3:endo-4a,8a-diepoxy - 1,2,3,4,4a,8a - hexahydro-exo-1,4-methanonaphthalene-5,8-dione gave essentially complete kill of *Helisoma trivolvis* living therein, at an exposure time of two hours, and at a concentration of 2 parts per million on the same basis, and an exposure time of 24 hours, gave complete kill of the snails.

These diepoxides are employed as mulluscicides by disseminating them in the required concentration in the water in which the undesired mollusks are dwelling Any suitable means for effecting the dissemination can be used— for example, the diepoxides can be stirred into the water, injected in a portion of the water wherein the water is in turbulent flow, or like mechanical means can be used. The dissemination can also be effected through the use of a highly hydrophilic surface-active agent, such as the water-soluble non-ionic surface-active agents, water-soluble anionic surface-active agents, particularly the esters of sulfuric acid, and which contain a plurality of ether moieties, and the like.

The non-ionic surface-active agents which can be used are described in Schwartz and Perry, "Surface Active Agents" (Interscience, 1949) in Chapter 8 thereof, and in Schwartz, Perry and Berch, "Surface Active Agents" (Interscience, 1958), on pages 125–138 and 163–166.

Thus, as pointed out in the first of these references, the suitable surface-active agents are those water-soluble materials which contain ether linkages, ester linkages or amide linkages, or which contain combinations of these linkages, to the solubilizing groups. Best known are the reaction products of hydrophobic hydroxy compounds (phenols, alcohols, including certain glycols) with several moles of a lower alkylene oxide (usually ethylene and/or propylene oxide). The kinds of these materials which are known, and methods for their preparation are described in detail in these references. Of particular importance are the polyethenoxy compounds which are described on pages 125–138 of the second reference. Also important are the alkylene oxide block copolymers described on pages 163–166 of that reference.

The diepoxide-surface-active agent compositions can be introduced into the water to be treated in any convenient manner. Often, particularly where the body of water to be treated in small or is in the form of a small canal, the composition to be used can be introduced by means of a syringe or hand-pump, or the like. Techniques of introduction which causes the composition to be introduced in the form of small droplets—as by, for example, the use of spray nozzles—are preferred.

At least about one part of the diepoxide per million parts by weight of the water treated generally is required to effect control of aquatic snails within a reasonable time, and ordinarily not more than 1000 parts per million of the diepoxide will be required. A concentration of from about two to about one hundred parts per million of the diepoxide ordinarily will be found satisfactory. At such concentrations, residence times of from a few minutes—say, 5–10 minutes—up to several hours—as much as a day—usually are sufficient, with the shorter times being associated with higher diepoxide concentrations.

The diepoxides are effective killers of mollusks, and particularly water-dwelling snails, including *Taphius glabratus, Helisoma trivolvis, Lymnaea bulimoides, Marisa*

*cornuarietis, Pomacea lineata, P. glauca,* and *Ocinebra japonica.*

In addition to being excellent agents for destroying various pests, the compounds of this invention also are useful for production of polymers of desirable characteristics. For example, useful hard insoluble polymer resins are prepared by heating one or more of the compounds of the invention at a temperature of about 150° C. with an equivalent amount of an acid anhydride in the presence of a tertiary amine as curing agent.

We claim as our invention:

1. A compound having the formula:

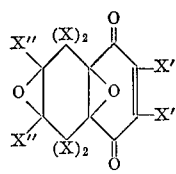

wherein each X, X' and X" is individually a member of the group consisting of hydrogen, middle halogen, hydrocarbon of from one to ten carbon atoms, free from acetylenic unsaturation, and substituted hydrocarbon from one to ten carbon atoms, free from acetylenic unsaturation, wherein each substituent is a member of the group consisting of halogen, nitro and cyano, with the provision that at least one of X" is hydrogen.

2. A compound having the formula:

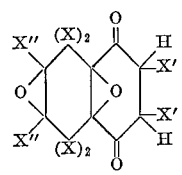

wherein each X, X' and X" is individually a member of the group consisting of hydrogen, middle halogen, hydrocarbon of from one to ten carbon atoms, free from acetylenic unsaturation, and substituted hydrocarbon from one to ten carbon atoms, free from acetylenic unsaturation, wherein each substituent is a member of the group consisting of halogen, nitro and cyano, with the provision that at least one of X" is hydrogen.

3. A compound having the formula:

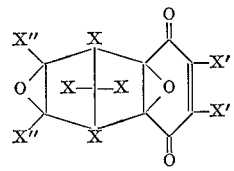

wherein each X, X' and X" is individually a member of the group consisting of hydrogen, middle halogen, hydrocarbon of from one to ten carbon atoms, free from acetylenic unsaturation, and substituted hydrocarbon from one to ten carbon atoms, free from acetylenic unsaturation, wherein each substituent is a member of the group consisting of halogen, nitro and cyano, with the provision that at least one of X" is hydrogen.

4. A compound having the formula:

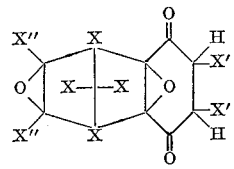

wherein each X, X' and X" is individually a member of the group consisting of hydrogen, middle halogen, hydrocarbon of from one to ten carbon atoms, free from acetylenic unsaturation, and substituted hydrocarbon from one to ten carbon atoms, free from acetylenic unsaturation, wherein each substituent is a member of the group consisting of halogen, nitro and cyano, with the provision that at least one of X" is hydrogen.

5. A compound of claim 3 wherein X' is chlorine, X is hydrogen and X" is hydrogen.

6. 6,7 - dichloro-exo - 2,3-endo-4a,8a-diepoxy-1,2,3,4, 4a,8a-hexahydro-exo-1,4-methanonaphthalene-5,8-dione.

References Cited by the Examiner

UNITED STATES PATENTS

| | | | |
|---|---|---|---|
| 1,891,168 | 12/32 | Luettringhaus et al. | 260—396 |
| 2,312,504 | 3/43 | Tishler | 260—348 |
| 2,312,535 | 3/43 | Fieser | 260—348 |
| 2,802,880 | 8/57 | Stoll et al. | 260—348 XR |
| 8,899,446 | 8/59 | Marks | 260—348 XR |

OTHER REFERENCES

Bedos et al., Comptes Rendus, vol. 196 (1933), pp. 1625–1627.

WALTER A. MODANCE, *Primary Examiner.*